US009223646B2

(12) United States Patent
Provencher et al.

(10) Patent No.: US 9,223,646 B2
(45) Date of Patent: Dec. 29, 2015

(54) ERROR DETECTION SYSTEMS AND METHODS

(75) Inventors: Michael A. Provencher, Cypress, TX (US); Kent E. Biggs, Tomball, TX (US)

(73) Assignee: Hewlett-Packard Development Company L.P., Houston, TX (US)

( * ) Notice: Subject to any disclaimer, the term of this patent is extended or adjusted under 35 U.S.C. 154(b) by 178 days.

(21) Appl. No.: 13/817,102

(22) PCT Filed: Oct. 12, 2010

(86) PCT No.: PCT/US2010/052338
§ 371 (c)(1),
(2), (4) Date: Feb. 14, 2013

(87) PCT Pub. No.: WO2012/050567
PCT Pub. Date: Apr. 19, 2012

(65) Prior Publication Data
US 2013/0145214 A1 Jun. 6, 2013

(51) Int. Cl.
*G06F 11/00* (2006.01)
*G06F 11/07* (2006.01)
*G06Q 10/06* (2012.01)

(52) U.S. Cl.
CPC .......... *G06F 11/079* (2013.01); *G06F 11/0754* (2013.01); *G06Q 10/06312* (2013.01)

(58) Field of Classification Search
USPC ............................................ 714/47.2, 39, 37
See application file for complete search history.

(56) References Cited

U.S. PATENT DOCUMENTS

| 6,820,038 | B1* | 11/2004 | Wetzer et al. ................. 702/184 |
| 8,015,306 | B2* | 9/2011 | Bowman ....................... 709/231 |
| 2002/0184568 | A1* | 12/2002 | Kurrasch ......................... 714/39 |
| 2002/0184576 | A1 | 12/2002 | Arndt et al. |
| 2003/0028835 | A1* | 2/2003 | Ishikawa ....................... 714/718 |
| 2004/0098633 | A1 | 5/2004 | Lienhart et al. |
| 2006/0149850 | A1* | 7/2006 | Bowman ....................... 709/231 |
| 2006/0224808 | A1 | 10/2006 | Depew et al. |
| 2010/0027463 | A1* | 2/2010 | Burge et al. ................... 370/328 |
| 2011/0055765 | A1* | 3/2011 | Neubrand et al. ............ 715/838 |
| 2011/0087639 | A1* | 4/2011 | Gurney ......................... 707/690 |

OTHER PUBLICATIONS

International Search Report Mail Date Jul. 7, 2011. Application No. PCT/US2010/052338 Filing Date Oct. 12, 2010.

* cited by examiner

*Primary Examiner* — Kamini Patel
(74) *Attorney, Agent, or Firm* — Hewlett-Packard Patent Department

(57) ABSTRACT

Error detection systems and methods are provided. An error detection system (100) can include a plurality of networked output devices (110) and a processor (130) coupled via a network (120) to the plurality of output devices. The processor can be configured to aggregate output data (135) from at least a portion of a plurality of parallel, networked, output devices. The processor can be further configured to compare (140) the aggregated output data with an output data sample selected from one of the plurality of output devices and detect (145) a discrepancy between the output data sample and the aggregated output data. The processor can also be configured to compare (150) the detected discrepancy to a predetermined threshold and signal (155) when the detected discrepancy exceeds the predetermined threshold.

16 Claims, 6 Drawing Sheets

ERROR DETECTION SYSTEMS AND METHODS

CROSS-REFERENCE TO RELATED APPLICATION

This application is a national stage application under 35 U.S.C. §371 of PCT/US2010/052338, filed Oct. 12, 2010.

BACKGROUND OF THE INVENTION

Description of the Related Art

The reduced cost and improved flexibility of output device networks has increased their market penetration and acceptance in commercial, industrial, and educational settings. In such settings the system often includes multiple output devices coupled to a network server. The output devices can include stand alone terminals executing a predetermined sequence of display images, or each of the output devices can display a sequence of images provided by the network server. The ability to remotely detect the display of unexpected content on one or more networked output devices can prevent the display of embarrassing content, such as an error message in a commercial setting, or prevent the display of inappropriate content, such as adult content in an educational setting.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
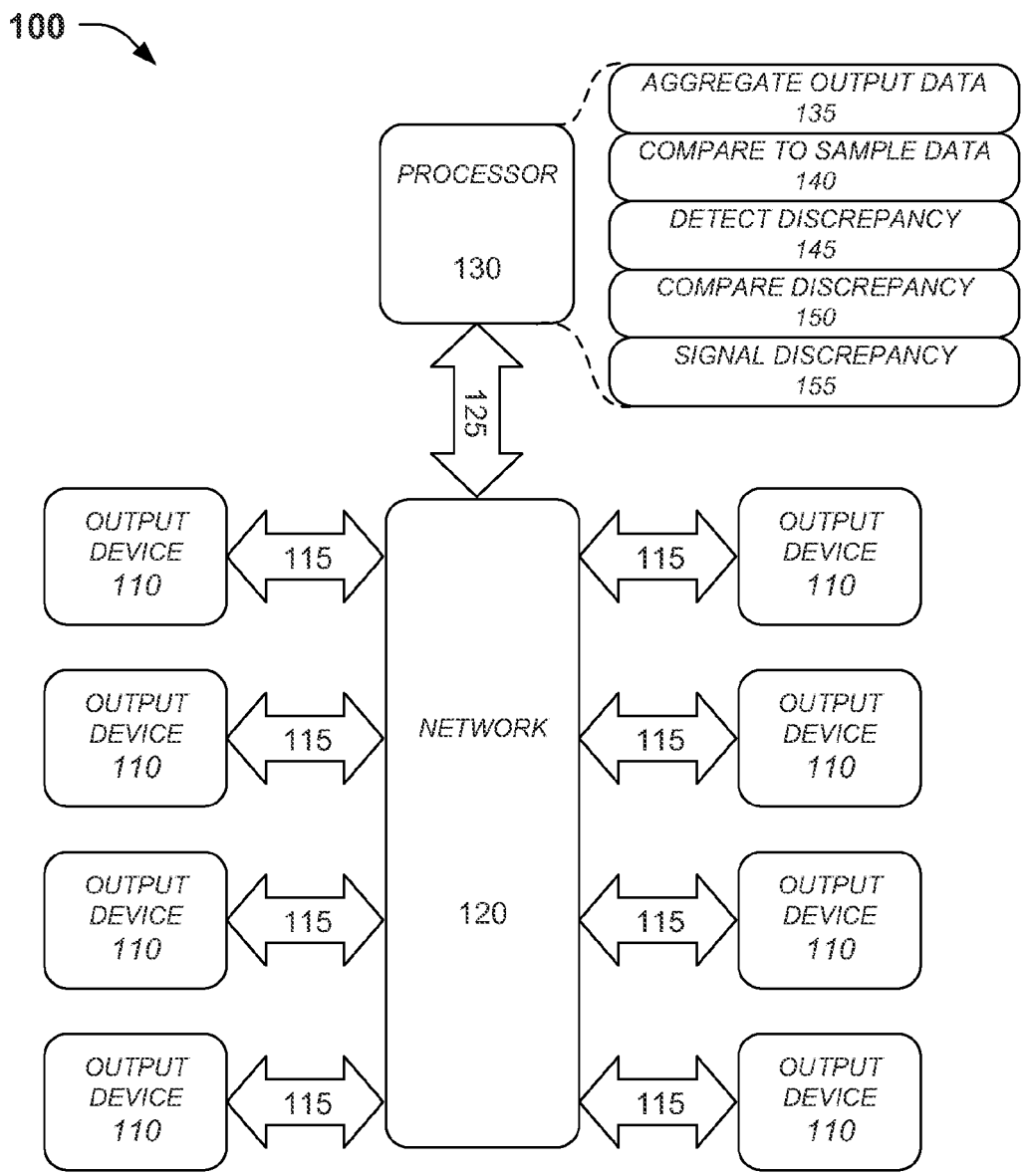
FIG. 1 is a block diagram depicting an illustrative error detection system, according to one or more embodiments described herein.

Networked output devices appear within many contexts. A department store having multiple networked video output devices serving as digital signage provides just one example of an output device network. In such a commercial network, digital advertising can be either programmed into storage in each of the display devices, or streamed from a server attached to the display network. A classroom having multiple networked student stations attached to an instructor's station provides another example of an output device network. In an educational network, educational content can be provided to each student by the instructor. In both instances, reliance is placed upon the provision of identical or near identical output data at each of the networked output devices.

The failure of one or more output devices to display identical or near identical output within an educational or commercial network can provide an indication that the one or more output devices have failed, or that the one or more output devices have been co-opted by a student for a purpose outside of the instructor provided curriculum. The ability to remotely detect such a condition, or any other output device error can provide the benefit of eliminating the output of embarrassing data in a commercial setting (e.g., the display of a "Windows Error" message in a prominently placed digital sign) or eliminating the output of inappropriate data in an educational setting (e.g., the display of adult or similar otherwise inappropriate content in a classroom setting).

The ability to either locally or remotely default to a predetermined output can provide an alternative to the presentation of unexpected or unwanted output on an output device. For example, rather than display a "Windows Error" message on a digital sign, the sign instead default to a customer greeting or store logo by either reading the image from a local or remote data source, an example of using passive output content. In another example, rather than display inappropriate content on a student output device, the output device may be provisioned to default to a "student output" portion of an instructor's desktop, an example of using active output content.

An error detection system is provided. The error detection system can include a plurality of networked output devices and a processor coupled to the plurality of output devices. The processor can be configured to aggregate output data from at least a portion of a plurality of parallel, networked, output devices. The processor can be further configured to compare the aggregated output data with an output data sample selected from one of the plurality of output devices and detect a discrepancy between the output data sample and the aggregated output data. The processor can also be configured to compare the detected discrepancy to a predetermined threshold and signal when the detected discrepancy exceeds the predetermined threshold.

An error detection method is also provided. The method can include aggregating output data from at least a portion of a plurality of networked output devices and sampling output data selected from one of the plurality of output devices. The method can further include comparing the aggregated output data with an output data sample and detecting a discrepancy between the output data sample and the aggregated output data. The method can also include comparing the detected discrepancy to a predetermined threshold and signaling when the detected discrepancy exceeds the predetermined threshold.

Another error detection method is also provided. The method can include coupling a plurality of output devices to a network and transmitting uniform output data to a plurality of output devices. The method can further include aggregating output data from at least a portion of a plurality of networked output devices and sampling output data selected from one of the plurality of output devices. The method can further include comparing the aggregated output data with an output data sample and detecting a discrepancy between the output data sample and the aggregated output data. The method can also include comparing the detected discrepancy to a predetermined threshold and signaling when the detected discrepancy exceeds the predetermined threshold. The method can also include alerting a management agent upon detection of the discrepancy and providing a predetermined output data to the single output device upon detection of the discrepancy.

FIG. 1 is a block diagram depicting an illustrative error detection system 100, according to one or more embodiments. The system can include a plurality of output devices 110 and a processor 130 coupled to a network 120. In some embodiments, the output provided to the plurality of output devices 110 can be supplied, in whole or in part, from a storage location accessible by the network 120. In yet other embodiments, the output provided to each of the plurality of output devices 110 can be provided in whole or in part from a storage location accessible by each of the plurality of output devices 110, for example a storage location disposed within each of the plurality of output devices 110. In some embodiments, the output provided to each of the plurality of output devices can be temporally synchronized such that each of the plurality of output devices 110 provides contemporaneous output that is nearly identical to the output data provided by each of the other output devices 110. In other embodiments, the output data provided to each of the plurality of output devices 110 can be identical, though not temporally synchronized such that each of the plurality of output devices 110 provides data that "leads" or "lags" each of the other output devices 110.

The plurality of output devices 110 can include any number of systems, devices, or any combination of systems and devices adapted to provide an audio, video, or combination audio and video ("A/V") output. In some embodiments, each of the plurality of output devices 110 can include one or more components such as a central processing unit (CPU), graphical processing unit (GPU), and a storage device such as a hard disk drive (HOD) or solid state drive (SSD). Each of the plurality of output devices 110 can include a wired, wireless, or combination wired and wireless network interface to permit communication with the network 120 via a network connection 115.

The plurality of output devices 110 can include a video display device, an audio display device, or a combination audio and video display device. Typical video display devices can include, but are not limited to, a cathode ray tube (CRT) display, a liquid crystal display (LCD), a light emitting diode (LED) display, an organic light emitting diode (OLED) display, and the like. Typical audio display devices can include, but are not limited to, speakers, headphone jacks, and the like.

In some embodiments, the audio data, video data, or audio/video data outputted by the output device can be retrieved across the network 120 via the network connection 115. In some embodiments, the audio data, video data, or audio/video data outputted by each of the plurality of output devices 110 can be retrieved, at least in part, from an onboard storage location disposed within each of the output devices forming the plurality of output devices 110. In some embodiments, each of the plurality of output devices 110 can include default data stored on-board the output device 110. For example, where each of the plurality of output devices 110 includes a video display device disposed within a department store, a default splash screen containing the department store logo may be stored on-board, i.e. within the on-board storage device disposed within each of the plurality of output devices 110. In another example, where each of the plurality of output devices 110 includes an audio display device disposed within a department store, a default set of preselected music tracks may be stored on-board, i.e. within the on-board storage device disposed within each of the plurality of output devices 110. In yet another example, in some embodiments, one or more network addresses pointing to an address containing a default output can be stored within an on-board storage device disposed within each of the plurality of output devices 110.

Each of the plurality of output devices 110 can be coupled to the network 120 via one or more network connections 115. In some embodiments, each of the plurality of output devices can be coupled to the network 120 using a plurality of redundant network connections 115. The one or more network connections 115 can include wired, wireless, or any combination of wired and wireless connections, for example Ethernet, Bluetooth®, 802.11b/g/n ("WiFi"), or combinations thereof.

The network 120 can include any number of systems, devices, or any combination of systems and devices suitable for providing uni- or bi-directional communications capabilities between the network 120, each of the plurality of output devices 110, and the processor 130. The network 120 can be a dedicated network, providing communication to each of the plurality of output devices 110 and processor 130, or the network can be shared, for example with a business enterprise system containing pricing, inventory, shipping and receiving information. In some embodiments, the network 120 can include a classroom environment where each of the plurality of output devices 110 is associated with one or more enrolled students.

In at least some embodiments, one or more network 120 functions and one or more functions of each of the plurality of output devices 110 can be monitored, controlled, or both monitored and controlled by the processor 130. The processor 130 can include any number of systems, devices, or any combination of systems and devices configured to provide one or more monitor or control functions applicable to the plurality of output devices 110. The processor 130 can be a stand-alone device, for example as depicted in FIG. 1, or the processor 130 can be disposed in, on, or about the network 120 or any of the plurality of output devices 110. For example, in some embodiments, the processor 110 can be disposed within one of the plurality of output devices 110. In at least some embodiments, the processor 130 can be disposed within one or more servers coupled to the network 120.

While the configuration of the processor 130 will be discussed in detail with reference to a video output, a similar configuration would apply with equal efficiency and effect to any other media format, including audio and mixed audio/video (NV) outputs.

In some embodiments, the processor 130 can be configured to execute a sequence of instructions related to ensuring the consistency of the output provided by each of the plurality of output devices 110. In some embodiments, the sequence of instructions can ensure the output provided by each of the plurality of output devices 110 is consistent in content or is within allowable temporal variation. Such a sequence of instructions can also provide default instructions or output where one of the plurality of output devices 130 deviates by greater than a predetermined threshold from the expected output.

The processor 130 can be configured to execute one or more instructions 135 to aggregate the output data from at least a portion of the plurality of networked, output devices. In some embodiments, such an aggregation may include one or more instructions to contemporaneously or simultaneously sample the output data provided by each of the plurality of output devices 110. For example, the processor 130 may collect a sample portion of the video display provided to an output device and average all of the collected samples to determine an aggregate profile of the sample. In another embodiment, the processor 130 may collect all or a portion of the frame buffer data supplied to each of the plurality of output devices 110.

In some embodiments, such an aggregation may include one or more instructions to sample the output data provided by each of the plurality of output devices 110 at temporally different points. For example where each of the plurality of display devices 110 generates an output temporally shifted from the remaining plurality of output devices, comparison of the actual video or audio output would be difficult. In such an instance, the aggregation may include delayed sampling of some or all of the plurality of output devices 110 to compensate for the temporal difference in the output from each of the plurality of output devices 110.

The processor 130 can be configured to execute one or more instructions 140 to compare the aggregated output data and the output data sample selected from one of the plurality of output devices. Such a comparison may include comparing one or more actual or calculated parameters selected from the aggregated output data and the output data sample, such parameters may include average color value, true color value, a pixel-by-pixel comparison, a region-by-region comparison, a frame buffer comparison, or similar. Continuing the above example, the processor can calculate an average red, green, and blue color values obtained from the aggregate samples and compare the average red, green, and blue color values with the average red, green, and blue color values obtained from the output data sample.

The processor 130 can be configured to execute one or more instructions 145 to detect discrepancies between the aggregated output data and the output data sample selected from one of the plurality of output devices 140. Such detection may include one or more operations to calculate a "difference" value between the aggregated output data and the output data sample selected from one of the plurality of output devices. In at least some embodiments, the absence of an output data sample or the inability to obtain an output data sample can trigger a default discrepancy condition. Continuing the above example, the processor could, in some embodiments, simply subtract the average red, green, and blue color values obtained from the aggregate samples from the average red, green, and blue color values with the average red, green, and blue color values obtained from the output data sample to provide a difference for the red, green, and blue color values.

In other embodiments, the one or more instructions 145 to detect discrepancies between the aggregated output data and the output data sample selected from one of the plurality of output devices 140 can include logic directed to the detection of temporal differences between all or a portion of the plurality of output devices 110. For example, where each of the plurality of output devices 110 provides a predetermined sequence of output, a discrepancy may exist where the temporal difference of a common output between one or more of the plurality of output devices 110 exceeds a predetermined temporal threshold. Such temporal differences can also apply to temporal differences between audio and video output on a common output device 110, for example when the audio output does not correspond or synchronize to the video output of the output device 110 within a predetermined discrepancy threshold.

The processor 130 can be configured to execute one or more instructions 150 to determine whether any discrepancies detected exceed a predetermined threshold. The predetermined threshold can constitute, in some embodiments, the maximum allowable difference between the sampled output data and the aggregated output data. A discrepancy in excess of the predetermined threshold may indicate the output device 110 providing the output data sample is not outputting media comparable in content to that displayed on the output devices providing the aggregated output data. Continuing the above example, the processor 130 could detect a difference in one or more red, green, or blue color values that exceeds a predetermined threshold. Such a difference could be attributable, for example, to a commercial display device outputting a "blue screen of death" while the other networked display devices display multicolor advertising.

The processor 130 can be configured to execute one or more instructions 155 to provide one or more signals or indicators when the detected discrepancy exceeds the predetermined threshold. Such a signal may include alerting a central console or monitor identifying the output device 110 providing the sample output data. Continuing the above example, the processor 130 after determining that a discrepancy exceeds the predetermined threshold for red, green, or blue color differential, could send a signal to a central monitoring station or the processor 130 to alert store personnel to the errant output device.

Figure 2:
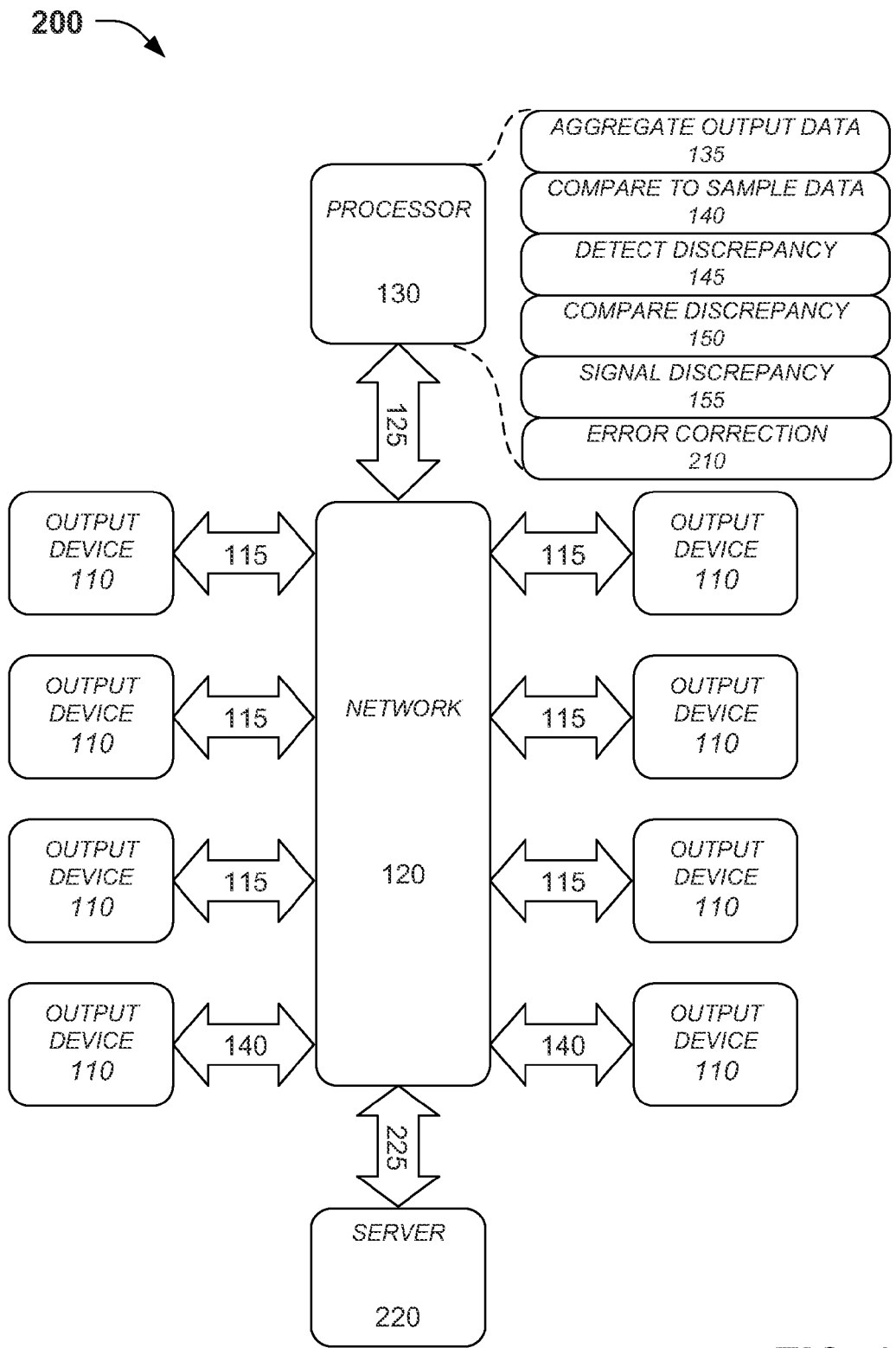
FIG. 2 is a block diagram depicting another illustrative error detection system, according to one or more embodiments described herein.

FIG. 2 is a block diagram depicting another illustrative error detection system 200, according to one or more embodiments. In at least some embodiments, the system 200 can similar to the system 100 depicted in and described in detail with respect to FIG. 1, with the addition of one or more processor executable instructions 210 to perform error correction when a discrepancy exceeding a predetermined threshold is detected. Additionally, the system 200 can include at least one server 220 coupled to the network via one or more connections 225.

In at least some embodiments, the processor 130 can be configured to execute one or more instructions 210 to perform error correction in the event a discrepancy exceeding a predetermined threshold is detected. Such error correction instructions 210 may include, in some embodiments, output of one or more predetermined media files, for example a greeting, store logo, or audio loop. The predetermined media files can be disposed within a storage module at least partially within the output device 110, within a storage module disposed at least partially on the network 120, within the at least one server 220, or any combination thereof.

In other embodiments, such error correction instructions 210 may include outputting duplicate media copied from another of the plurality of output devices 110 from the output device 110 supplying the output data sample. In other embodiments, the one or more instructions 210 can include, at least in part, one or more reboot or reset instructions to perform a warm reboot or resetting of the output device 110. Continuing the example cited with reference to FIG. 1 the processor 130, after sending a signal to a central monitoring station to alert store personnel to the malfunctioning output device, could execute one or more instructions 210 to output a predetermined image stored within a storage module disposed within the errant output device 110.

A server 220 can be connected to the network 120. In some embodiments, the processor 130 can be disposed, in whole or in part within the server 220. In at least some embodiments, the processor 130 can be all or a portion of the server 220 central processing unit (CPU). In at least some embodiments the output data provided to each of the plurality of output devices 110 can be supplied from a storage module disposed within the server 220. In at least some embodiments, the output data supplied to a errant output device 110 can be supplied from a storage module disposed within the server 220.

Figure 3:
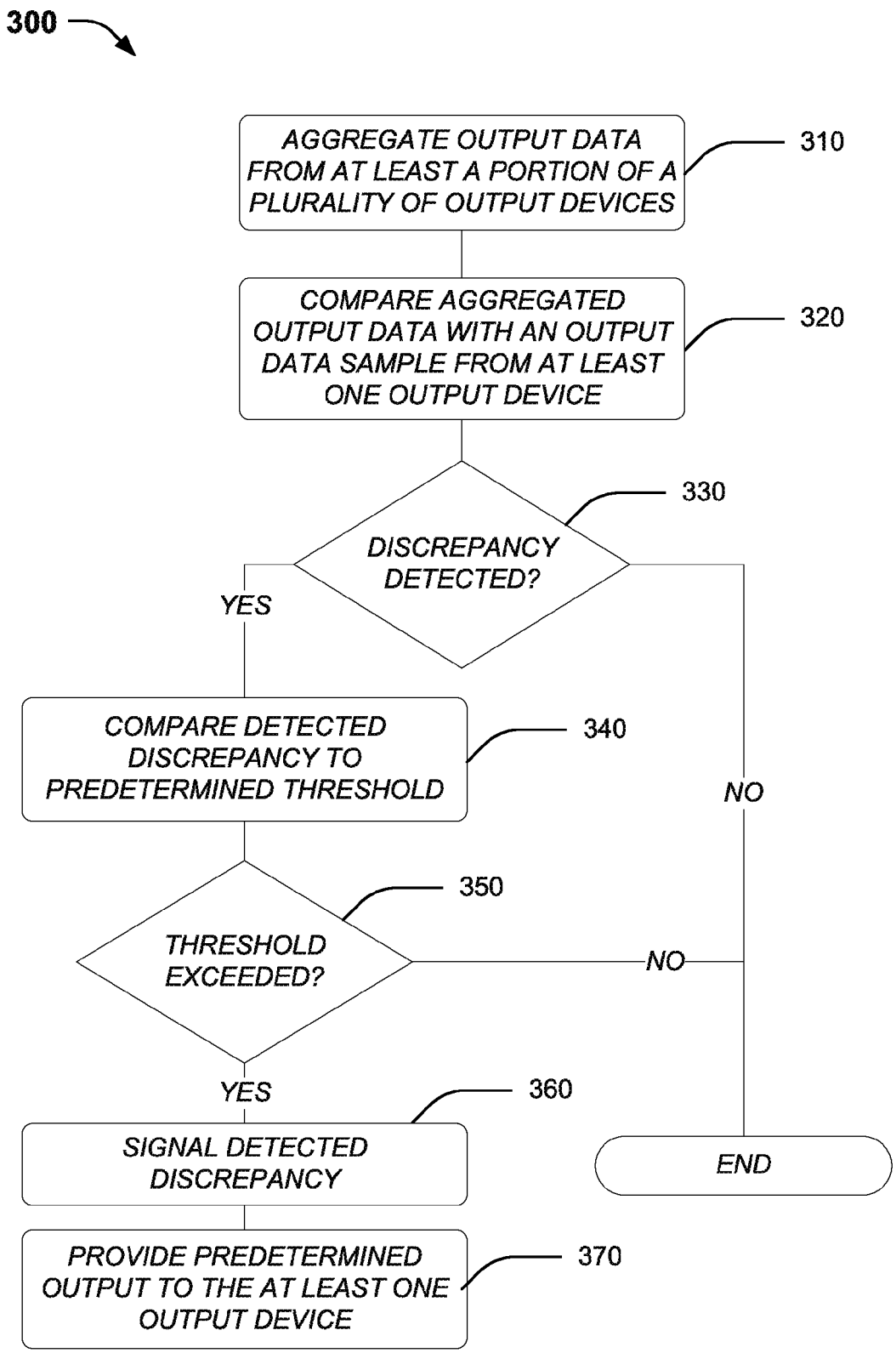
FIG. 3 is a flow diagram depicting an illustrative error detection method, according to one or more embodiments described herein.

FIG. 3 is a flow diagram depicting an illustrative error detection method 300, according to one or more embodiments. In at least some embodiments, the error detection method can incorporate a plurality of output devices 110 coupled to a network 120. In at least some embodiments, at least a portion of the output is delivered via the network 120 to each of the plurality of output devices 110. In other embodiments, at least a portion of the output can be delivered from a storage module disposed at least partially within all or a portion of the plurality of output devices 110. A processor 130 configured to execute instructions forming the method 300 can be coupled to the network 120.

The method 300 can include aggregating output data from at least a portion of the plurality of output devices 110 at 310. In some embodiments, the output data can include audio data, video data, still image data, or any combination thereof, for example audio/video (A/V) data associated with a video and voiceover. The aggregation of data at 310 can minimize the impact of minor, acceptable, fluctuations between individual output devices 110. The aggregated output data can include all or a portion of the output data provided to each of the plurality of output devices 110. For example, the aggregated data might include an average tonal value for an audio output delivered by each of the plurality of output devices 110. In another example, the aggregated data might include average red, green, and blue color values for all or a portion of the video data supplied to each of the plurality of output devices 110.

The method 300 can further include comparing the aggregated data from 310 with an output data sample acquired from at least one of the plurality of output devices 110 at 320. In some embodiments, the comparison can be conducted on one or more data parameters to provide a qualitative measure of the degree of similarity of the output data between the aggregated output devices and the sampled output device, i.e., to determine whether the sampled output device is outputting data similar to that outputted by the remaining output devices. In other embodiments, the comparison can be conducted not on the data itself, but instead upon the relationship of the data to one or more physical parameters, for example the temporal shift of the data, i.e., to determine whether the output data sample is temporally synchronized with the aggregated data. In yet other embodiments, the comparison can include one or more data parameters and a one or more physical parameters, for example to determine whether the output data sample is similar in content to the aggregated data and to determine whether the output data sample is temporally synchronized, within predetermined limits, to the aggregated data.

The method 300 can include determining whether a discrepancy between the output data sample and the aggregated data exists at 330. The determination can include, for example, evaluating the difference between one or more output data sample parameters and one or more comparable aggregated data parameters. In some embodiments, one or more video output characteristics or parameters, for example the average red, green, and blue color values can be compared between the aggregated output data and the output data sample to determine whether a discrepancy exists.

The method 300 can include comparing the detected discrepancy to a predetermined threshold at 340 once a discrepancy is detected at 330. The predetermined threshold 340 can be stored within the processor 130, within each of the plurality of output devices 110, within the server 220, or within the network 120. The predetermined threshold can include one or more individual thresholds, for example, a single threshold can be used to determine whether cross spectrum color deviation (i.e., deviation across the red, green, and blue levels) does not exceed a single, combined, threshold value. In other embodiments, multiple thresholds can be used to identify single primary color deviations (i.e., deviation across the red, green, or blue levels) does not exceed an individual predetermined threshold established for each color.

Where the predetermined threshold is exceeded at 350, the method can include signaling that a discrepancy has been detected at 360. In some embodiments, the signal can include one or more audio or visual indicators provided at a central location. In some embodiments, the signal can include additional information, for example the nature and magnitude of the detected discrepancy.

The method 300 can include providing predetermined output to at least one output device 110 at 370. The processor 130, upon detecting a discrepancy exceeding a predetermined threshold, can provide predetermined output or instruct the output device to load predetermined output from a storage module to the output device 110 source supplying the output data sample. For example, upon detecting a color discrepancy in the output device providing the output data sample, the processor 130 can provide a predetermined video image, a greeting or a store logo for example, to the errant output device 110. The predetermined image can, in some embodiments, be sourced from a server 220 disposed on the network 120. In other embodiments, the predetermined image can be sourced from a storage module disposed in one of the output devices 110.

Figure 4:
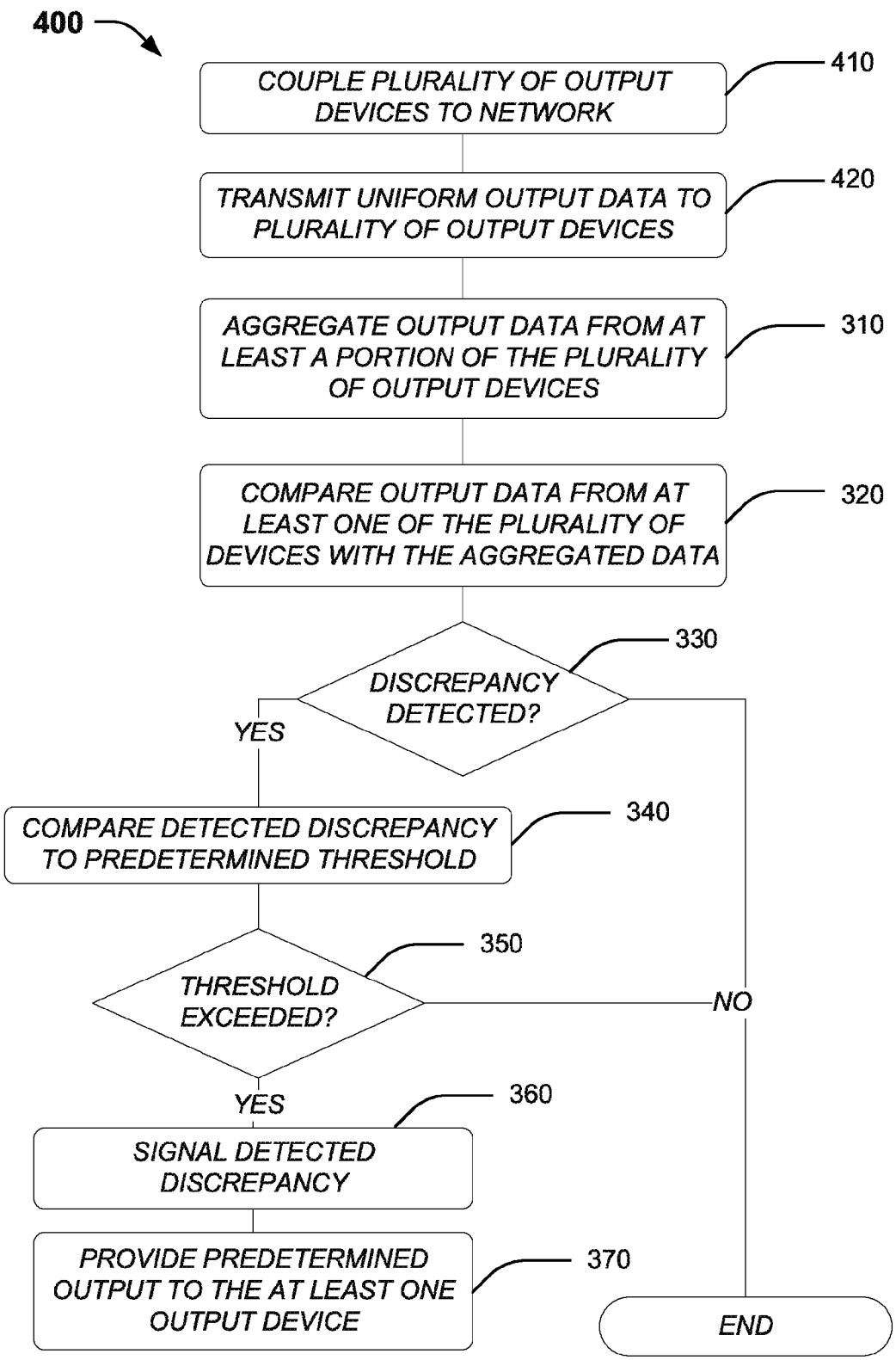
FIG. 4 is a flow diagram depicting another illustrative error detection method, according to one or more embodiments described herein.

FIG. 4 is a flow diagram depicting another illustrative error detection method 400, according to one or more embodiments. In at least some embodiments, the output data provided to each of the plurality of output devices 110 can be simultaneously transmitted to each of the plurality of output devices 110.

The method 400 can include coupling a plurality of output devices 110 to a network 120 at 410. In at least some embodiments, a server 220 can also be coupled to the network 120. The network 120 can, in some embodiments, include a plurality of output devices 110, for example a thin or zero client device provided to each student in a classroom environment. In some embodiments, an administrative server 220 can include, for example an instructor's interface to the network 120. In some embodiments, the output data on each of the plurality of output devices 110 can be supplied in whole or in part from the administrative (i.e., instructor) server 220.

As used herein the term "thin client" refers to a computing device having limited local non-volatile storage, for example storage sufficient to locally boot an operating system, coupled to a network. The device can download applications and data from one or more centralized network locations or can run applications from a network location using a shared operating environment. The term "zero client" refers to a computing device having similar performance and capable of providing limited input and output capabilities but having no local operating system.

The method can further include transmitting uniform output data to each of the plurality of output devices 110 at 420. In at least some embodiments, the uniform output data can be provided by a server 220 coupled to the network 120. In other embodiments, the uniform output data can be provided from storage modules disposed within all or a portion of the plurality of output devices 110. Extending the prior classroom example, the administrative server used by the instructor in a classroom setting can be used to provide uniform output data, for example a lesson plan, to each of the plurality of output devices 110 provided to each student in the classroom.

Figure 5:
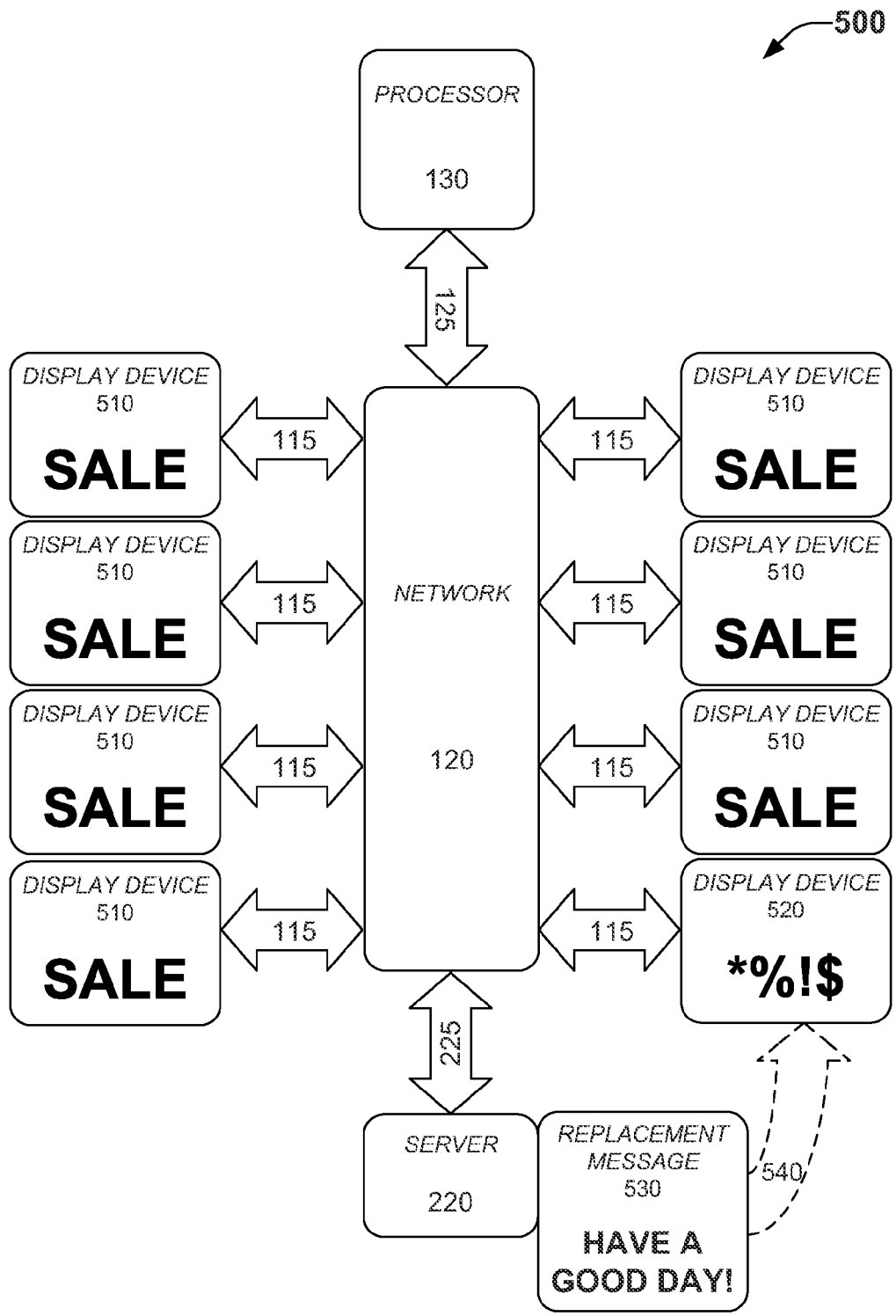
FIG. 5 is a block diagram depicting an embodiment of an illustrative error detection system, according to one or more embodiments described herein.

FIG. 5 is a block diagram depicting an example of an error detection system 500, according to one or more embodiments. The error detection system 500 depicted in FIG. 5 is provided in the context of a commercial display where a plurality of output devices 510 represent audio/video display devices disposed prominently throughout a retail establishment. Using such a system, the retailer can provide consumers information related to the various products and services provided by the retailer. In such an embodiment, the retailer is reliant upon the sales message being delivered to the consumer in a relatively rapid, relatively concise, yet professional manner.

The output delivered by each of the output devices 510 can be provided for example using a server 220 coupled to the network 120. The output can include, among other things, one or more sale notifications as depicted in FIG. 5.

In some embodiments, an output device 520 can experience a failure of communications, video driver failure, LCD failure, or the like, thereby displaying either an error message or some other inappropriate content adverse to the interests of the retailer. As previously disclosed in some detail, the processor 130 attached to the network 120 can, by sampling the output from output device 520 and comparing the sampled output to the aggregated output from the remaining plurality of output devices 510 detect the discrepancy in the video output of the failed output device 520. The detection of such a deficiency may be accomplished using a pixel-by-pixel, region-by-region, or average color comparison.

Upon detecting the output discrepancy, in some embodiments, the processor 130 can provide one or more instructions to the server 220, for example one or more instructions to provide 540 a predetermined replacement message 530 to the failed output device 520. In other embodiments, the processor 130 can provide one or more instructions via the network 120 directly to the failed output device 520 instructing the failed output device 520 to load a predetermined replacement message 530 from a storage module disposed either on the network 120 or from a storage module disposed within the failed output device 520 itself.

Figure 6:
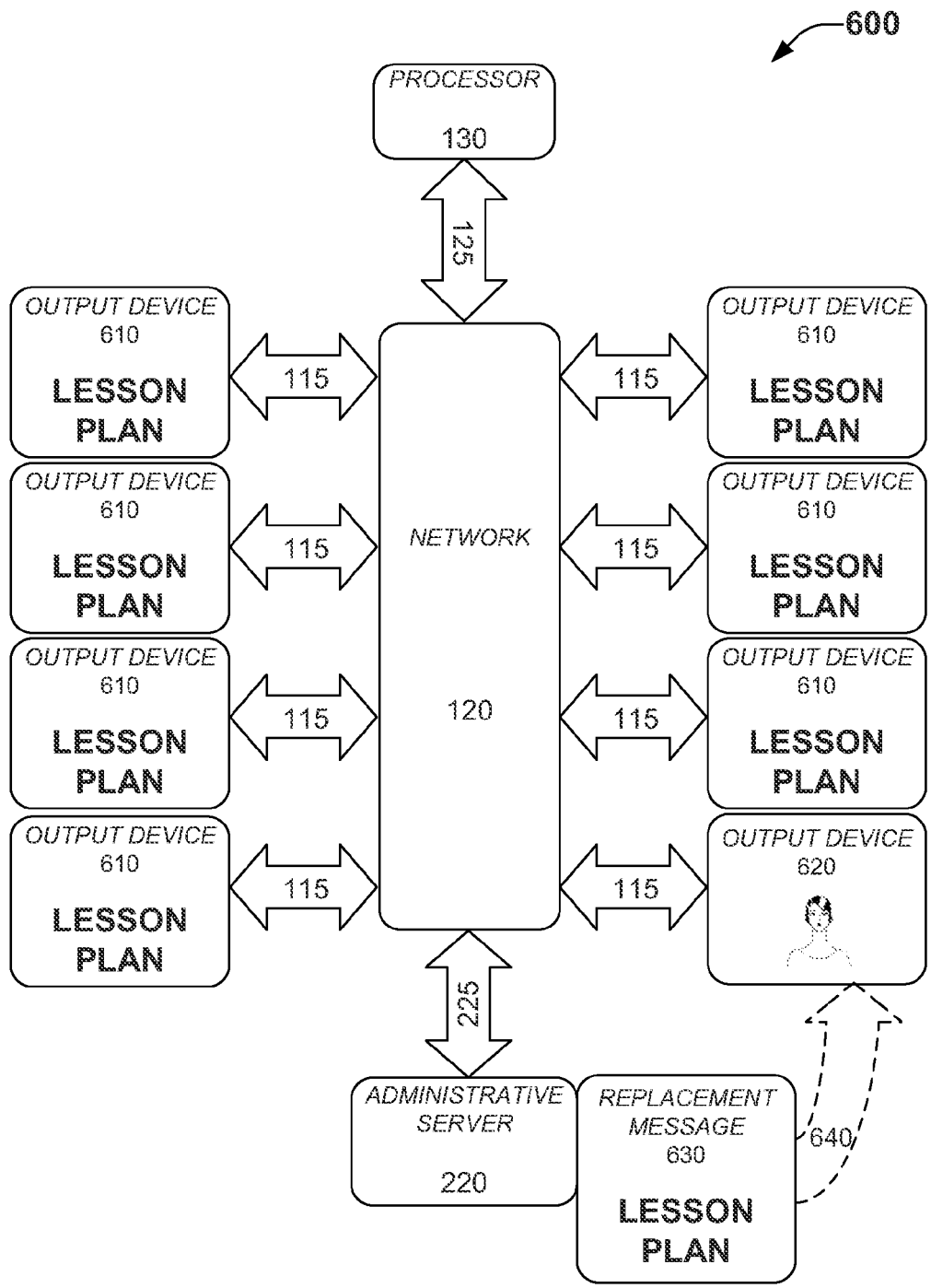
FIG. 6 is a block diagram depicting another embodiment of an illustrative error detection system, according to one or more embodiments described herein.

FIG. 6 is a block diagram depicting an example of another error detection system 600, according to one or more embodiments. The error detection system 600 depicted in FIG. 6 is provided in the context of an educational environment where a plurality of output devices 610 represent audio/video display devices disposed with students in a classroom setting. In such an environment, the plurality of output devices 610 can be disposed proximately, such as in a traditional classroom environment, or remotely, such as in a distance learning environment. Using such a system, the instructor can provide a uniform lesson plan to each of the plurality of output devices. In such an embodiment, the instructor is reliant upon the lesson plan being delivered to the each student/output device 610 in a consistent manner with a minimum number of distractions.

The output delivered by each of the plurality of output devices 610 can be provided for example using an administrative server 620. In at least some embodiments within an educational environment, the administrative server 620 can be in whole or in part, the instructor's network device. The output provided to each of the plurality of output devices 610 can include, among other things, a lesson plan as depicted in FIG. 6.

In some embodiments, a student in the classroom can access material not related to the lesson plan provided by the instructor, for example a student can access a webpage unrelated to the lesson plan using the output device 620. As previously disclosed in some detail, the processor 130 attached to the network 120 can, by sampling the output from output device 620 and comparing the sampled output to the aggregated output from the remaining plurality of output devices 610 detect the discrepancy in the video output of the failed output device 620. The detection of such a deficiency may be accomplished using a pixel-by-pixel, region-by-region, average color, or frame buffer comparison of the output from output device 620 with the aggregated output from the remaining plurality of output devices 610.

Upon detecting the output discrepancy, in some embodiments, the processor 130 can provide one or more instructions to the administrative server 220, for example one or more instructions to provide 640 a predetermined replacement message 630, for example the lesson plan displayed to all of the other plurality of output devices 610, to the output device 620 displaying the inappropriate output content. In other embodiments, the processor 130 can provide one or more instructions via the network 120 directly to the failed output device 620 instructing the output device 620 to load predetermined output content from a storage module disposed either on the network 120 or within the output device 620 itself.

What is claimed is:

1. A system, comprising:
   at least one processor configured to:
   aggregate output data from at least a portion of a plurality of parallel, networked, output devices, the aggregating comprising:
   identifying a first output data sample from a first output device of the at least a portion of the plurality of output devices, and a second output data sample from a second output device of the at least a portion of the plurality of output devices, the identified second output data sample being time-shifted from the first output data sample by a time amount that compensates for a temporal difference in output data presented by the first and second output devices, and
   aggregating the first and second output data samples;
   compare the aggregated output data with an output data sample from a given output device of the plurality of output devices;
   detect a discrepancy between the output data sample from the given output device and the aggregated output data;
   compare the detected discrepancy to a predetermined threshold; and
   output an indication in response to the detected discrepancy exceeding the predetermined threshold.

2. The system of claim 1, the at least one processor further configured to:
   in response to the indication, perform error correction by causing the given output device to present a predetermined output.

3. The system of claim 1, wherein the given output device is selected from the group consisting of: a video output device, an audio output device, and an audio/video output device.

4. The system of claim 1, wherein the discrepancy between the output data sample from the given output device and the aggregated output data is selected from the group consisting of: a discrepancy in audio output, and a discrepancy in video output.

5. The system of claim 1, further comprising a server to provide output content to each of the plurality of output devices for output by the plurality of output devices.

6. The system of claim 5, wherein the discrepancy between the output data sample from the given output device and the aggregated output data represents a discrepancy between an expected output provided by the server and an actual output provided by the given output device.

7. The system of claim 1, wherein the plurality of output devices comprise a plurality of video output devices, wherein aggregating the output data from the at least a portion of the plurality of output devices comprises aggregating output video data from at least a portion of the plurality of video output devices, and wherein the comparing comprises comparing the aggregated output video data with an output video data sample from the given output device.

8. The system of claim 7, further comprising a server to send output video content to the plurality of video output devices, to cause the plurality of video output devices to display a predetermined sequence of output video data.

9. The system of claim 7, wherein the aggregated output video data comprises aggregated color data, and wherein the comparing is of the aggregated color data with one or multiple color values in the output video data sample from the given output device.

10. The system of claim 9, wherein the at least one processor is in the server.

11. An error detection method, comprising:
aggregating, by a system including a processor, output data from at least a portion of a plurality of networked output devices, the aggregating comprising:
identifying a first output data sample from a first output device of the at least a portion of the plurality of output devices, and a second output data sample from a second output device of the at least a portion of the plurality of output devices, the identified second output data sample being time-shifted from the first output data sample by a time amount that compensates for a temporal difference in output data presented by the first and second output devices, and
aggregating the first and second output data samples;
sampling, by the system, output data from a given output device of the plurality of output devices;
comparing, by the system, the aggregated output data with the sampled output data;
detecting, by the system, a discrepancy between the sampled output data and the aggregated output data;
comparing, by the system, the detected discrepancy to a predetermined threshold; and
providing, by the system, an indication in response to the detected discrepancy exceeding the predetermined threshold.

12. The method of claim 11, wherein the output data from each of the plurality of output devices is selected from the group consisting of: audio data, video data, and audio/video data.

13. The method of claim 11, wherein detecting the discrepancy between the sampled output data and the aggregated output data comprises:
detecting a temporal discrepancy between the sampled output data and the aggregated output data in excess of a predetermined threshold.

14. The method of claim 11, further comprising:
in response to the indication, causing a predetermined output to be presented by the given output device instead of video content provided to the plurality of output devices.

15. A non-transitory computer-readable storage medium storing instructions that upon execution cause a system to:
transmit output content to a plurality of output devices, the output content to cause the plurality of input devices to present output data;
aggregate output data from at least a portion of the plurality of output devices, the aggregating comprising:
identifying a first output data sample from a first output device of the at least a portion of the plurality of output devices, and a second output data sample from a second output device of the at least a portion of the plurality of output devices, the identified second output data sample being time-shifted from the first output data sample by a time amount that compensates for a temporal difference in output data presented by the first and second output devices, and
aggregating the first and second output data samples;
sample output data from a given output device of the plurality of output devices;
compare the sampled output data with the aggregated output data;
detect a discrepancy between the sampled output data and the aggregated output data;
output an alert in response to detecting of the discrepancy; and
in response to the alert, cause the given output device to present predetermined output data instead of output data based on the output content.

16. The method of claim 15, wherein detecting the discrepancy between the sampled output data and the aggregated output data comprises:
detecting a temporal discrepancy between the output data sample and the aggregated output data exceeding a predetermined threshold.

* * * * *